(12) United States Patent
Ungarish

(10) Patent No.: US 12,386,433 B2
(45) Date of Patent: *Aug. 12, 2025

(54) CONTROLLING VIEWING ORIENTATION OF A MOBILE DEVICE DISPLAY

(71) Applicant: David Ungarish, Tel Aviv-Jaffa (IL)

(72) Inventor: David Ungarish, Tel Aviv-Jaffa (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/622,954

(22) Filed: Mar. 31, 2024

(65) Prior Publication Data

US 2024/0241590 A1 Jul. 18, 2024

Related U.S. Application Data

(63) Continuation of application No. 17/958,459, filed on Oct. 3, 2022, now Pat. No. 11,947,741.

(30) Foreign Application Priority Data

Oct. 3, 2021 (IL) .......................................... 286925

(51) Int. Cl.
| | |
|---|---|
| G06F 3/0346 | (2013.01) |
| G06F 1/16 | (2006.01) |
| G06F 3/14 | (2006.01) |
| H04M 1/724 | (2021.01) |

(52) U.S. Cl.
CPC .......... *G06F 3/0346* (2013.01); *G06F 1/1694* (2013.01); *G06F 3/14* (2013.01); *H04M 1/724* (2021.01)

(58) Field of Classification Search
CPC . G06F 3/0346; G06F 3/14; G06F 3/17; G06F 3/0487; G06F 1/1694; H04M 1/724; H04M 1/72454; G09G 2340/0492; G09G 2354/00; G06T 3/60
USPC .......................................................... 345/659
See application file for complete search history.

(56) References Cited

U.S. PATENT DOCUMENTS

| | | | | |
|---|---|---|---|---|
| 10,228,691 | B1 * | 3/2019 | Pounds | G01S 13/88 |
| 10,305,766 | B1 * | 5/2019 | Zhang | G06N 3/044 |
| 2017/0329515 | A1 * | 11/2017 | Clement | G06F 3/011 |
| 2020/0076520 | A1 * | 3/2020 | Jana | H04B 17/327 |
| 2021/0097718 | A1 * | 4/2021 | Fisch | G06T 7/73 |

* cited by examiner

*Primary Examiner* — Prabodh M Dharia
(74) *Attorney, Agent, or Firm* — AlphaPatent Associates Ltd.; Daniel J. Swirsky

(57) ABSTRACT

Viewing orientation of a display of a mobile device is changed by automatically tagging a change in a dynamic parameter of the device as intended or unintended based on a following change in a dynamic parameter of the device, the following change occurring within a predefined time period. The tagged change is used to train a detector to determine when a change in a dynamic parameter of the device implies a user intended change of viewing orientation. The trained detector is used to provide a determination of intention and a change of viewing orientation of the display is affected based on the determination.

20 Claims, 8 Drawing Sheets

CONTROLLING VIEWING ORIENTATION OF A MOBILE DEVICE DISPLAY

FIELD

The present invention relates to mobile devices and to controlling viewing orientation of the display of a mobile device.

BACKGROUND

Mobile electronic devices, such as, notebook computers, personal digital assistants (PDAs), satellite navigation devices, electronic book readers, portable media players, portable game consoles and mobile phones, are usually equipped with a user interface. The user interface typically comprises a display through which a user may view content and interact with and operate the mobile device. Display systems may be configured to orient displayed content vertically or horizontally (also referred to as "portrait" and "landscape" orientations, correspondingly).

Some mobile phones include an automatic feature that switches between portrait and landscape viewing orientation of content on their display, based on a detected orientation of the phone relative to the ground, which may be derived from data received from one or more sensors within the phone device. Once a changed orientation of the phone is detected a signal is generated to change the viewing orientation accordingly.

Unfortunately, switching between orientations of a phone does not always mean the user intended to switch viewing orientation. Thus, this automatic feature may actually inconvenience the user. Overriding the automatic switching between display viewing orientations requires manual operation by the user, further inconveniencing the user.

SUMMARY

Embodiments of the invention provide a method for controlling viewing orientation of a display of a mobile device based on user intent rather than based on pre-set rules relating to changes in device orientation, as done in existing mobile devices.

Embodiments of the invention also provide a mobile device and method for overriding the currently existing automatic switch between display orientations, by adding a step of determining whether a change in device orientation implicates an intended change in viewing orientation.

Embodiments of the invention affect a change in a display viewing orientation in accordance with a user's intention, without any manual operation required from the user.

Embodiments of the invention include a non-transitory machine readable medium embodying instructions that, when executed by a machine, cause the machine to perform a method for determining intent to change viewing orientation of a display of a mobile device. The method may include receiving recent accumulated data from a sensor connected to the mobile device. The data typically includes dynamic (e.g., kinematic) parameters. Values of at least one dynamic parameter are compared over time to determine an evolution of the parameter. Intent to change viewing orientation is determined based on the evolution of the parameter and a change of viewing orientation of the display is affected when an intent to change viewing orientation is determined.

BRIEF DESCRIPTION OF THE DRAWINGS

The invention will now be described in relation to certain examples and embodiments with reference to the following illustrative drawing figures so that it may be more fully understood. In the drawings.

DETAILED DESCRIPTION

Embodiments of the invention include a mobile device, its user interface, and methods of controlling the device and user interface. The mobile device may be a portable communications device having additional other functions, such as a mobile phone. In some embodiments a mobile device may include wearable devices such as smart watches, head mounted devices having a display, etc. Although the examples illustrated below typically refer to mobile phones, embodiments of the invention include any suitable mobile device, such as, notebook computers, PDAs, satellite navigation devices, electronic book readers, portable media players, portable game consoles, wearable devices, virtual reality (VR) and/or augmented reality (AR) and/or mixed reality (MR) devices, etc.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "analyzing", "processing," "computing," "calculating," "determining," "detecting", "identifying", "learning", "changing", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Unless otherwise stated, these terms refer to automatic action of a processor, independent of and without any actions of a human operator.

Figure 1A:
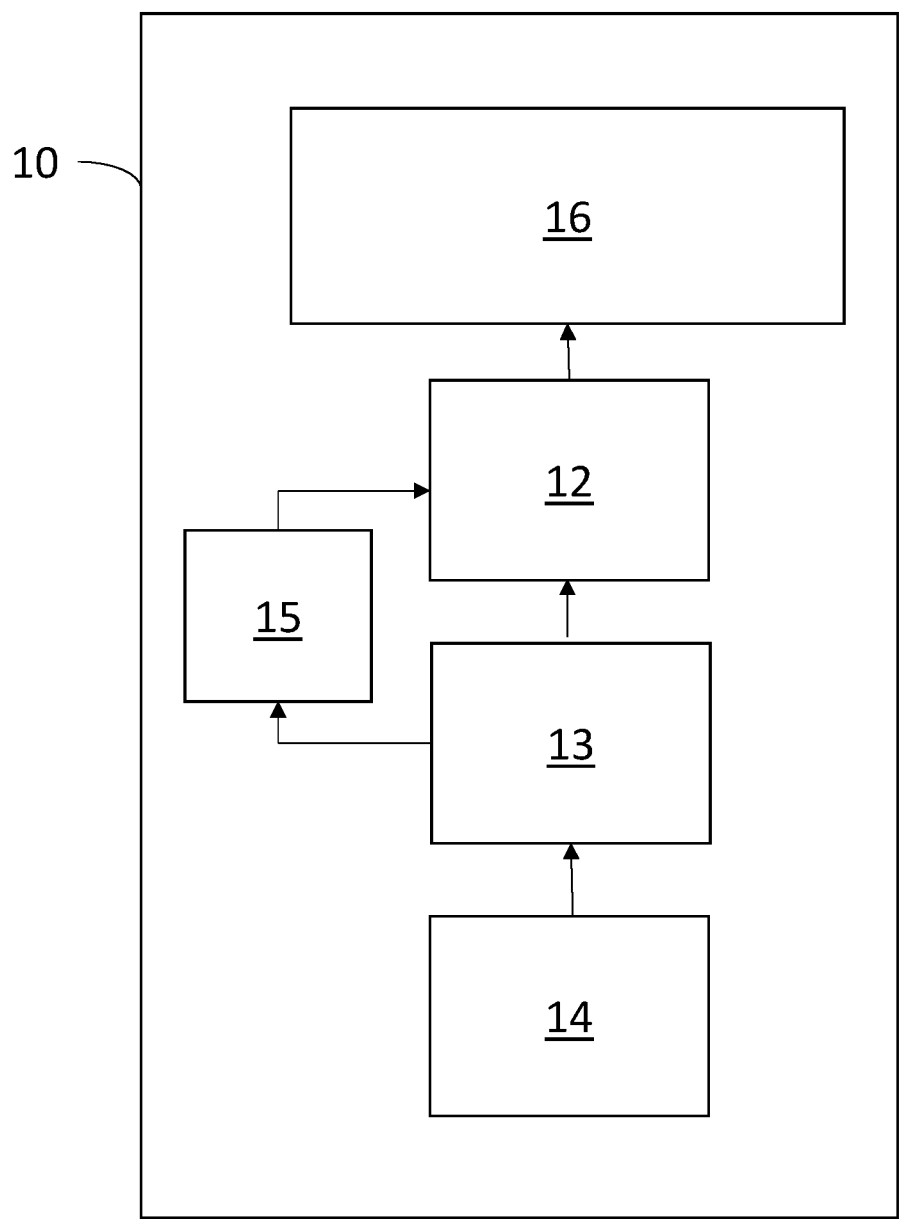
FIGS. 1A and 1B schematically illustrate a device and system operable according to embodiments of the invention.

A mobile device, according to one embodiment of the invention, is schematically illustrated in FIG. 1A.

A mobile device 10 runs a user interface which includes a display 16 for displaying content to a user. Content may be displayed in different viewing orientations, e.g., in a portrait orientation view, where the vertical axis of the content is longer than its horizontal axis, in a landscape orientation view, where the horizontal axis of the content is longer than its vertical axis, or in any orientation in between. Display 16 may include a suitable screen, for example, an organic light emitting diode (OLED) display, an active-matrix organic light emitting diode (AMOLED), or a liquid-crystal display (LCD), such as an IPS (in-plane switching) screen or thin film transistor liquid crystal display (TFT LCD). A user may interact with and possibly operate the device 10 via display 16, e.g., by utilizing touch screen technology or other technology available for user-device interactions in the field of mobile devices.

Device 10 further includes one or more sensor(s) 14 connected to it, namely, in communication with it. Typically, sensor 14 senses dynamic parameters of the device 10. Dynamic parameters of the device are parameters that can have different values based on intention of a user to change viewing orientation. For example, dynamic parameters may include kinematic parameters, such as, motion data (including, for example, velocity and/or direction of the motion), acceleration (including its direction) and/or orientation of the device. Sensor 14 may provide data from which dynamic (e.g., kinematic) parameters can be calculated. Sensor 14 may include, for example, an accelerometer to determine acceleration of device 10 in X, Y, Z axes and/or a gyroscope to track rotation and twist of the device 10 and/or a magnetometer for detecting the orientation of device 10 relative to the earth's magnetic north (also referred to as a "down direction sensor"). Other suitable sensors may be used. For example, sensor 14 may include a camera connected to device 10. Parameters, such as, direction and angle of rotation, may be calculated from images obtained by the camera, e.g., by analyzing differences between consecutively captured images.

Thus, sensor 14 may provide data to indicate an orientation of the device 10 and/or a change of orientation of the device 10. Although orientation of display 16 is usually aligned with the orientation of the device 10, the orientation of content displayed on the display 16, namely, the viewing orientation, may be independent of the orientation of the device. For example, a device may be held perpendicularly to the ground but content displayed on that device may be displayed in a landscape orientation, typically, parallel to the ground, and vice versa.

Device 10 includes, or is in communication with, a processor 12. Processor 12 may include, for example, one or more processors and may be a central processing unit (CPU), a graphics processing unit (GPU), a digital signal processor (DSP), a field-programmable gate array (FPGA), a microprocessor, a controller, a chip, a microchip, an integrated circuit (IC), or any other suitable multi-purpose or specific processor or controller. Processor 12 may be locally embedded or remote, e.g., cloud-based. In some embodiments, processor 12 may be configured to process neural networks, such as, feature extraction from input data, loss calculation, weight update of neural networks, e.g., by back-propagation, etc. Processor 12 may perform learning functions of a network and/or data classification using network functions, etc.

Processor 12 is typically in communication with a memory unit, such as, a random access memory (RAM), a dynamic RAM (DRAM), a flash memory, a volatile memory, a non-volatile memory, a cache memory, a buffer, a short term memory unit, a long term memory unit, or another suitable memory unit or storage units. The memory unit stores executable instructions that, when executed by processor 12, facilitate performance of operations of processor 12, as further described herein.

Processor 12, may include a user interface (UI) controller, to control the viewing orientation of display 16. Processor 12 may receive a signal requesting change of viewing orientation of the display. The request for change of viewing orientation may be generated from any suitable software application and/or hardware-based sensor typically provided with mobile devices, e.g., based on an orientation of device 10 as detected from data received from sensor 14. In some embodiments processor 12 reacts directly to a change in orientation of device 10 or to a change in parameters indicative of a change of orientation of device 10.

According to embodiments of the invention, once orientation of device 10 is changed and/or once a signal requesting to change viewing orientation is received at processor 12, the processor 12 affects (or not) a change of viewing orientation based on recent accumulated data from sensor 14. Recent accumulated data includes data output from the sensor immediately prior to the change of orientation and/or to the signal requesting to change viewing orientation.

In one embodiment device 10 includes a buffer 13, which may be a suitable memory unit, for example, a memory unit using FIFO (first in, first out) logic, such as a circular buffer, to store data generated by sensor 14. The data stored in buffer 13 may include one or more parameter, such as, acceleration in either one of X, Y or Z direction, orientation of the device 10 (or of display 16), orientation relative to the ground, etc.

Processor 12, which may be in communication with buffer 13, may extract recent accumulated data from buffer 13, e.g., data from a typically short and limited time period (e.g., 1, 2, 3, 4 or 5 seconds) immediately prior to the change in orientation and/or to receiving the signal requesting to change viewing orientation, at processor 12. In one embodiment, processor 12 receives a signal requesting change of viewing orientation of the display 16 and enables the change of orientation based on recent accumulated data from buffer 13. In another embodiment, processor 12 initiates a change of orientation based on recent accumulated data from buffer 13.

Processor 12 may process or manipulate the data received from the buffer 13 to generate features representing the data, and may then use these features to determine if to affect (or not) a change of viewing orientation per a received signal and/or based on a change of orientation of a device. For example, processor 12 may perform a statistical or other calculation on the data received from sensor 14 (e.g., via buffer 13) to produce features that can be used in the determination if to affect a change of viewing orientation.

In one embodiment, software running on mobile device 10 may cause data generated by sensor 14 to be continuously stored in buffer 13. The buffer 13 may store data received within a limited and short time period (e.g., 1-5 seconds, in one example, 3 seconds), continuously overwriting older data to ensure the buffer always includes the most recent data. Once a change of orientation of the device happens and/or a signal requesting to change viewing orientation is received, all or some of the data currently stored in buffer 13 is used by processor 12, to determine whether to initiate a change of viewing orientation and/or to enable the requested change of orientation to occur.

The determination by processor 12, whether to affect a change of viewing orientation, is typically based on a determination of user intent. Thus, in one embodiment, processor 12 may initiate or enable change of viewing orientation only if recent accumulated data from sensor 14 demonstrates an intended change of viewing orientation by a user.

In one embodiment, an intended change of viewing orientation is determined if data from sensor 14 shows a discriminating change in (possibly) a single kinematic parameter, such as an acute change, as opposed to a gradual change. Thus, if, for example, an orientation of a device, as determined e.g., based on data from a down direction sensor, changes quickly and/or at a large angle, such a change would be considered to demonstrate intent. This would happen, for example, in a situation where a user rotates a mobile device, while viewing it, with the intent of changing the viewing orientation of the device's display. However, if, for example, an orientation of a device, as determined e.g., based on data from a down direction sensor, changes gradually, such a change would not be considered to demonstrate intent. This would happen, for example, in a situation where a user holding a mobile device changes his body position from standing or sitting to reclining, while holding the device.

Alternatively or in addition, a combination of changes of several dynamic (e.g., kinematic) parameters together (even if they are acute changes) may demonstrate an unintended change. Thus, if, for example, an orientation of a device changes acutely in only one direction, e.g., as determined by an accelerometer, such a change would be considered to demonstrate intent. This would happen, for example, when a user rotates a mobile device with the intent of changing the viewing orientation of the device's display. However, if an orientation of a device changes acutely, but with several parameters changing (possibly simultaneously or almost simultaneously, e.g., within 1-2 seconds), such as, acceleration in several directions, or acceleration in some directions but no acceleration in other directions, such combinations of changes would not be considered to demonstrate intent. This would happen, for example, in a situation where a user puts the mobile device down from his hand onto a table or other surface.

Thus, in some embodiments, processor 12 affects a change of orientation (e.g., initiates a change or enables a requested change) based on a magnitude of change in recent accumulated data. The magnitude of change may represent, for example, a delta of parameter values and/or a number (e.g., combination) of changed parameters.

For example, a delta of parameter values may include the absolute value of an angle of orientation of a device (or its display) relative to the ground at time (t) subtracted from the angle of orientation of a device (or its display) relative to the ground at time (t+1), where both (t) and (t+1) are within the time frame of the recent accumulated data. If this absolute value is above a predefined, calculated or learned threshold, it could indicate an intended change and processor 12 may affect a change of orientation, whereas, if the absolute value is below the threshold, processor 12 may not affect the change of orientation.

In another embodiment, processor 12 will affect a change if the amount of changed parameters is below a threshold. For example, a parameter may include acceleration in a single direction. If a difference in acceleration of a mobile device at time (t) and time (t+1) is above a threshold, processor 12 may affect a change in viewing orientation if the acceleration increased in one direction (e.g., along the X axis), but not affect the change in viewing orientation if the acceleration increased in more than one direction (e.g., along the X, Y and Z axes).

In other embodiments processor 12 will affect a change in viewing orientation based on a combination of changes. For example, processor 12 may affect a change in viewing orientation if a specific combination of changes occurs (e.g., changes in one set of parameters but no change in another set of parameters).

In some embodiments, device 10 may include or may be in communication with a trained detector 15 that can provide a determination of intended (or unintended) change. Detector 15, which may include, for example, a machine learning (ML) or Deep Learning (DL) model (e.g., random forest, neural-network based classifier), runs a function to determine, based on recent accumulated data from sensor 14 (possibly, based on features extracted from the recent accumulated data), which is input to the function, whether the data demonstrates an intended change or if there was no intent to change viewing orientation.

Similarly, detector 15 may be used to determine (e.g., learn) a threshold, which can be specific per device and/or per user, above or below which a change will be considered a discriminating change and which demonstrates an intended change. Thus, in some embodiments, detector 15 may determine when recent accumulated data implies a user intended change of viewing orientation based on comparison of the data to a threshold, which may be learned per device and/or user.

Machine learning techniques, such as, feature extraction from input data, loss calculation, weight update of neural networks, e.g., by back-propagation, etc., may be used to train detector 15 on data from sensor 14. In some embodiments, training examples may be automatically generated. For example, a rotation event of a device may be tagged as unintended if the device is immediately (e.g., within a predefined time period) rotated back to its initial position. Thus, training of detector 15 may occur continuously, during normal use of the device, without any input required from the user.

Figure 1B:
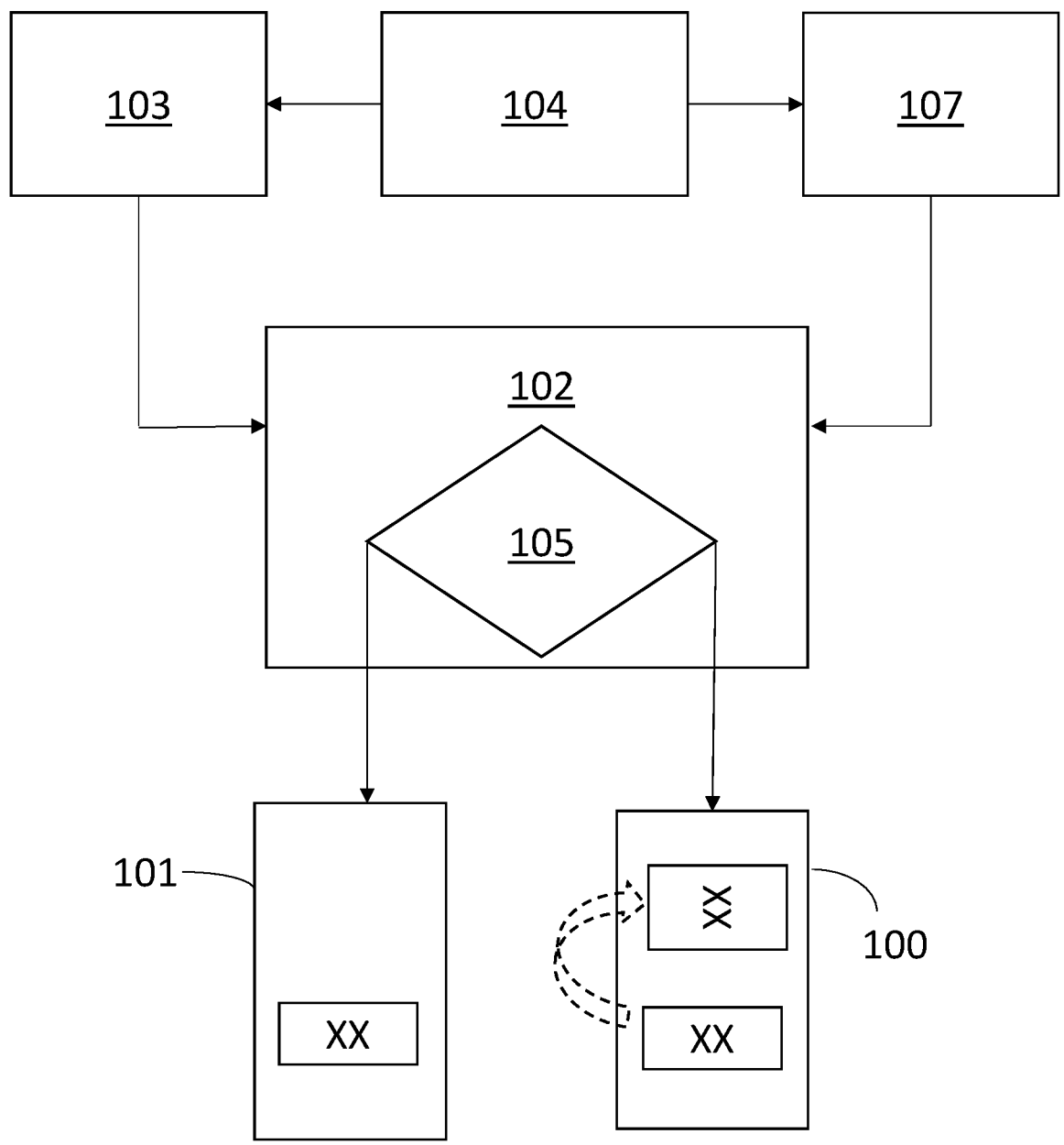

In one embodiment, which is schematically illustrated in FIG. 1B, a system operable with a mobile device, such as mobile device 10, includes a buffer 103 to store data received from one or more sensor(s) 104 which is connected to the mobile device. A processor 102, which is in communication with the buffer 103, receives a signal requesting change of viewing orientation of the display and enables the change of viewing orientation based on data from the buffer 103. In another embodiment processor 102 initiates a change of viewing orientation based on data from the buffer 103.

The system may further include a detector 105 trained on data from the sensor 104, to determine when accumulated data (namely, data captured over time) implies a user intended change of viewing orientation. Processor 102 affects the requested change of orientation based on a determination of the detector 105.

In one embodiment, output from sensor 104 is stored in buffer 103 and at the same time may be used by a software application 107 to generate a request to change viewing orientation of a display based on a current orientation of the device and/or based on a change in orientation of the device, as determined, for example, by the output from sensor 104. In other embodiments, application 107 may generate a request to change viewing orientation based on other considerations. The request from application 107 is typically directed to processor 102. Upon receiving a signal generated by application 107, detector 105 outputs a determination whether recent accumulated data from buffer 103, implies a user intended change of viewing orientation. The determination output by detector 105 may be a yes/no output or a statistical or other score, based on which the viewing orientation of a display of the device will be changed 100, or not 101.

Thus, although a step (of determining if a change detected in dynamic parameters of a device indicates intent) is added to the usual flow of mobile device operation, due to use of a buffer and trained detector, this added step does not perceptibly slow down the device operation and also provides a much desired method of overriding the usual automatic mechanism of changing viewing direction, such that viewing orientation of a mobile device is changed only when intended so by a user.

Systems, according to embodiments of the invention, typically include a non-transitory machine readable medium embodying instructions that, when executed by a machine, cause the machine to perform a method for determining intent to change viewing orientation of displayed content of a mobile device and/or for controlling change of viewing orientation of a display of a mobile device.

Figure 2A:
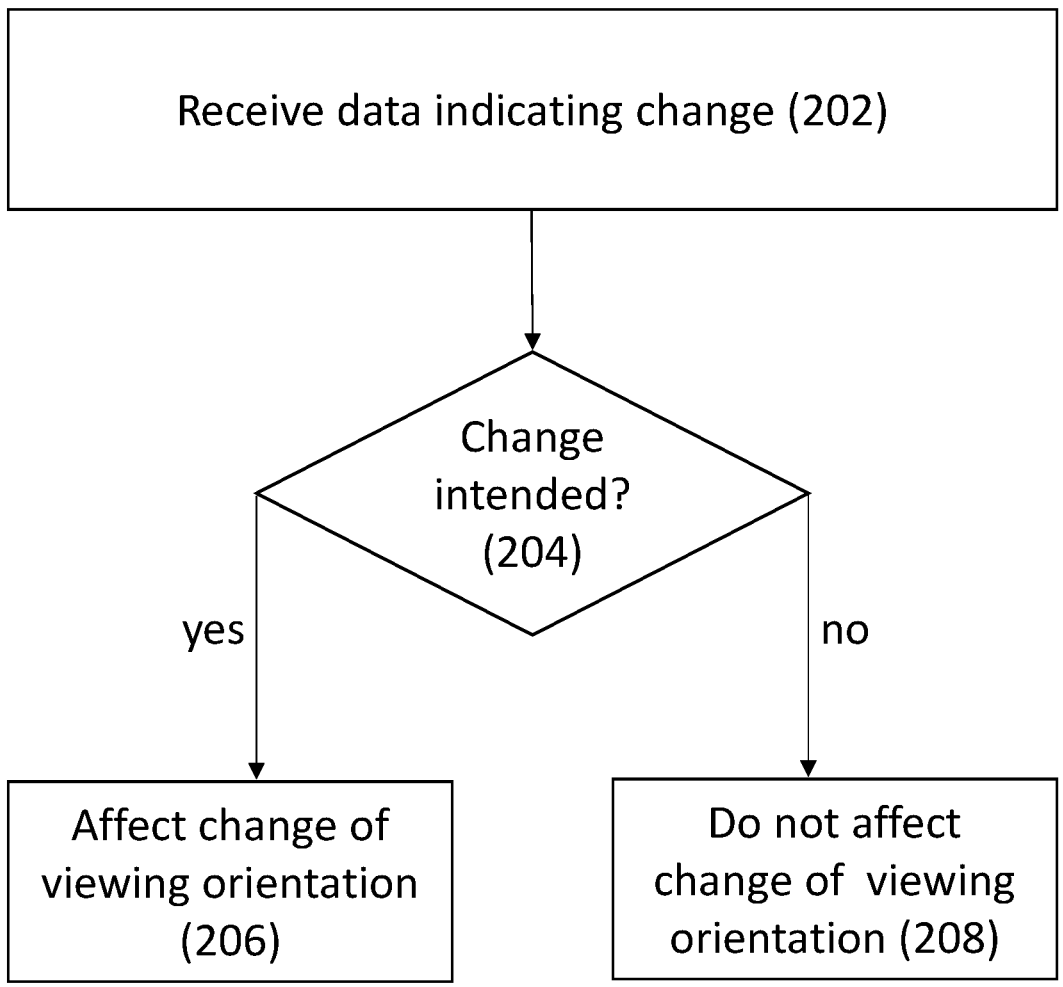
FIGS. 2A-D schematically illustrate methods for enabling a rotation in viewing orientation, according to embodiments of the invention.

A method, according to one embodiment, which is schematically illustrated in FIG. 2A, includes receiving, from a sensor connected to a mobile device, data indicating a change in a dynamic parameter of the device (202). A determination is then obtained (e.g., by processor 102 and/or detector 105) of whether the change indicates an intended change of viewing orientation (204). If the determination indicates an intended change, then a change of viewing orientation of the display is affected (206). If the determination indicates no intention to change viewing orientation, then a change of viewing orientation of the display is not affected (208).

In one embodiment, a processor obtains a determination of an intended change based on whether the change is acute. For example, the processor may determine a magnitude of change of at least one dynamic parameter, over time, where a large magnitude may indicate an acute change. The processor may then determine whether the change indicates an intended change, based on the magnitude. Namely, if the magnitude is above a threshold (which may be, for example, predefined, calculated or learned) it may be determined that a change in device orientation is intended to change the viewing orientation, whereas, if the magnitude is below the threshold, it may be determined that the change in device orientation is not intended to change the viewing orientation.

Figure 2B:
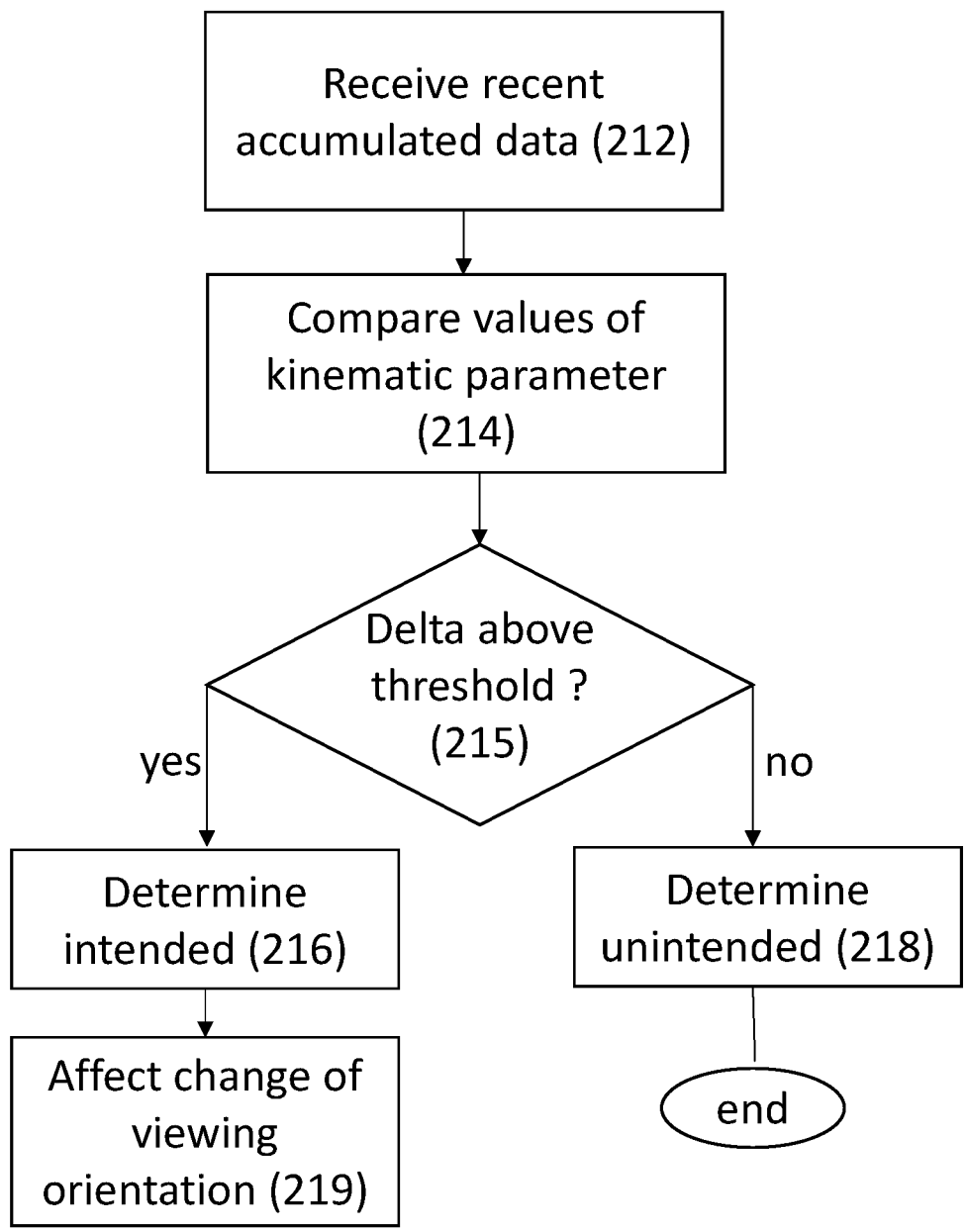

In an example schematically illustrated in FIG. 2B, recent accumulated data (which typically includes parameters, such as kinematic parameters, obtained within a limited, short time frame) is received (212), typically from a sensor connected to a mobile device. Values of at least one parameter over time are compared, to determine a delta between the parameter at two time points within the time frame (214). If the delta is above a threshold (215) then an intent to change viewing orientation is determined (216). If the delta is below the threshold, then an intent to change viewing orientation is not determined (218). A change of viewing orientation of the display may be affected (219) when an intent to change viewing orientation is determined (216).

Figure 2C:
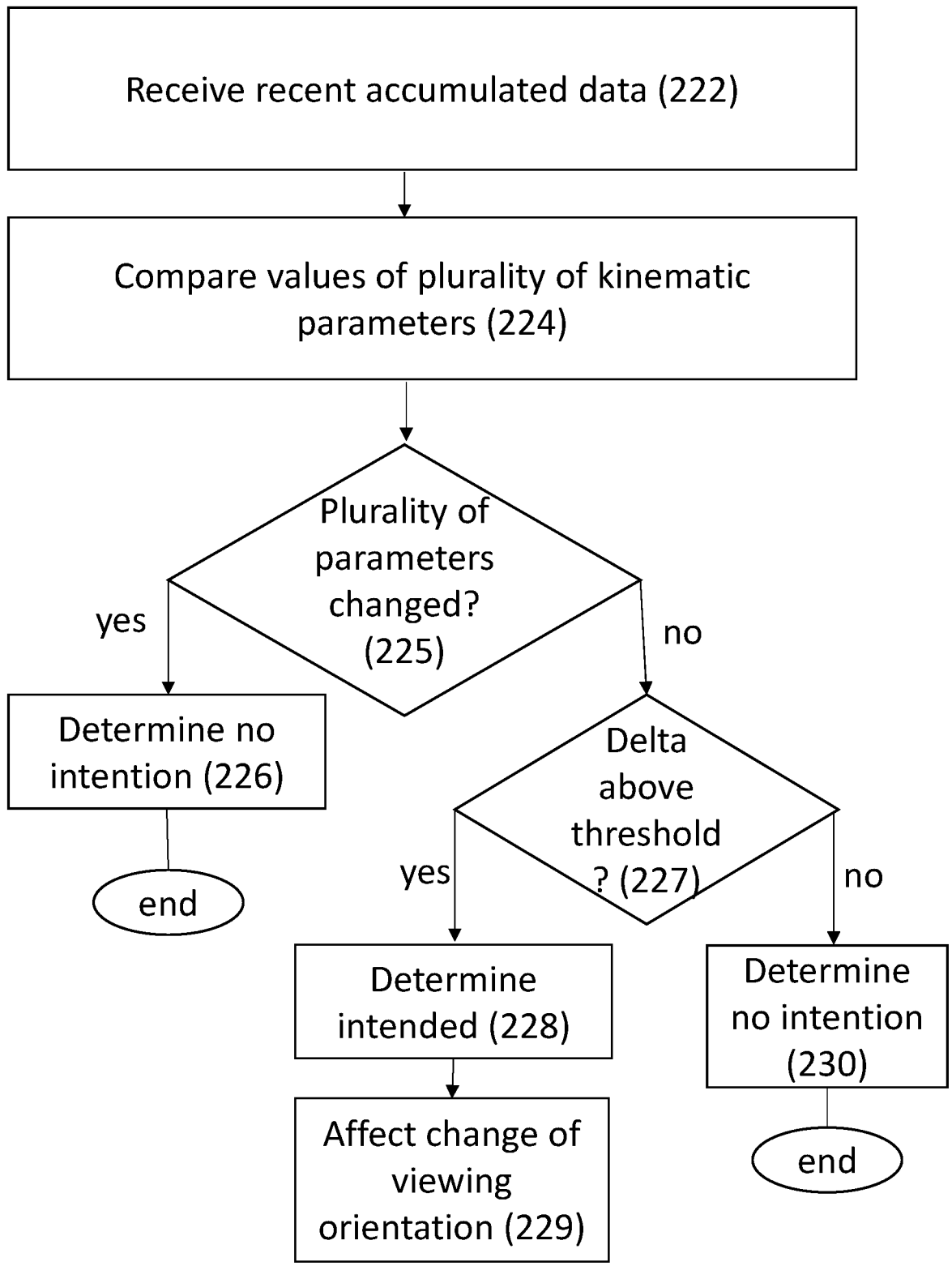

In another embodiment, an example of which is described in FIG. 2C, a processor obtains a determination of an intended change based on the number of changed dynamic parameters. Thus, the processor may determine an amount of changed dynamic parameters and determine whether a change of dynamic parameters indicates an intended change of viewing orientation, based on the amount of changed dynamic parameters. For example, if more than one parameter changed, even if the changes (all or some of the changes) were acute changes, the processor may determine that there was no intent to change the viewing orientation of the display, in which case a change of viewing orientation of the display may not be affected.

In the example schematically illustrated in FIG. 2C, values of more than one (or another predetermined number) parameter are compared and if a simultaneous (or nearly simultaneous) change is detected in more than the predetermined number of parameters, then no intent to change viewing orientation is determined.

Recent accumulated data (which typically includes parameters, such as kinematic parameters, obtained within a limited, short time frame) is received (222), typically from a sensor connected to the mobile device. Values of a plurality of parameters, over time, are compared (224). If a plurality of parameters (e.g., above a predetermined number of parameters) changed simultaneously (225) then no intent to change is determined (226) and a change of viewing orientation of the display is not affected. If less than a predetermined number of parameters (e.g., only one) changed (225) and if the delta of the parameter over time is above a threshold (227) then an intent to change viewing orientation is determined (228) and a change of viewing orientation of the display is affected (229). If the delta of the parameter over time is above a threshold (227) then no intent to change viewing orientation is determined (230) and change of viewing orientation of the display is not affected.

In some embodiments, the parameters compared in step 224 are parameters of a same type but of different directions, such as acceleration in different directions.

In another embodiment, auxiliary information is obtained, typically, information referring to the time of receiving data indicating a change in a dynamic parameter of the device. The auxiliary information may be input (e.g., to processor 102 and/or detector 105) and a determination of whether the change in dynamic parameter indicates an intended change of viewing orientation can then be made based on the obtained auxiliary information. Auxiliary information may relate, for example, to use of the device and/or to the environment sensed by the device.

Figure 2D:
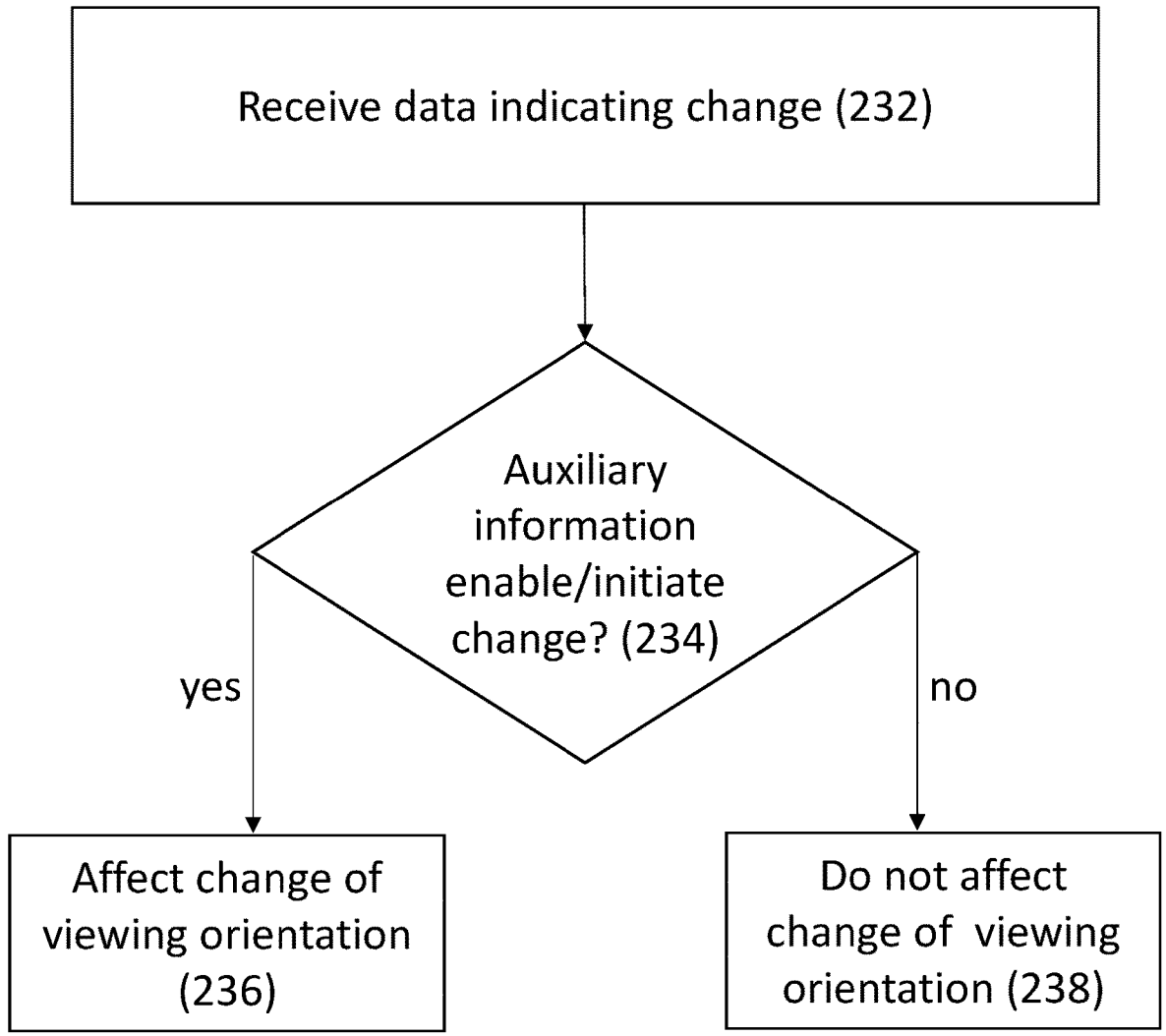

In the example schematically illustrated in FIG. 2D, data indicating a change in a dynamic parameter of the device is received (232), typically from a sensor connected to the mobile device. Auxiliary information is analyzed (e.g., by processor 102 and/or detector 105) to determine, based on the auxiliary information, whether to affect a change of viewing orientation (234). For example, auxiliary data, may include user inputs to the device and/or whether an application is currently being used, typically, whether a specific application is currently being used. Other auxiliary information may include information regarding current conditions, e.g., ambient light, geographical location, etc.

If it is determined, e.g., that the auxiliary information shows intent and/or that that auxiliary information enables or initiates change of orientation, then a change of viewing orientation of the display is affected (236). If it is determined that the auxiliary information does not show intent and/or does not enable or initiate change), then a change of viewing orientation of the display is not affected (238).

For example, current use of applications for reading news or books (e.g., Kindle™) may be defined as not showing intent of the user to change orientation while using the app, thus processor 102 may not affect change of viewing orientation when such an app is being used, whereas current use of applications for viewing images or videos (e.g., YouTube™) may be defined as showing intent to change viewing orientation when changing device orientation, thus processor 102 may enable change of viewing orientation while this app is being used. Thus, for example, if processor 102 determines that a specific application, such as a news app or book reading app, is being used concurrently with receiving data indicating a change in a dynamic parameter of the device, then a change of viewing orientation may be prevented. If processor 102 determines that a specific application, such as an image or movie viewing app, is being used concurrently with receiving data indicating a change in a dynamic parameter of the device, then a change of viewing orientation may be affected.

In some embodiments, affecting the change of viewing orientation of the display may be based on user permission, in conjunction with the auxiliary information. For example, a user may provide instructions or permissions to enable change of viewing orientation when a specific application is currently being used and not to enable change of viewing orientation if the specific application is not currently being used and/or if a specific other application is being used.

A classifier (e.g., detector 105) may be pre-trained (or trained on-line) to detect which auxiliary information shows intent and should enable or initiate a change in viewing orientation and which should not. For example, a detector, e.g., predictor, may receive as input use patterns of a specific user while using specific applications and/or in different environments, and may learn to determine the applications and/or other conditions in which the specific user intends to change view of orientation. Based on the predicted intent (or based on other predictions of the classifier) a change of orientation may be affected or not.

According to embodiments of the invention, a detector (e.g., a machine learning model) may be used to determine whether a change of device orientation indicates an intended change of viewing orientation.

Figure 3:
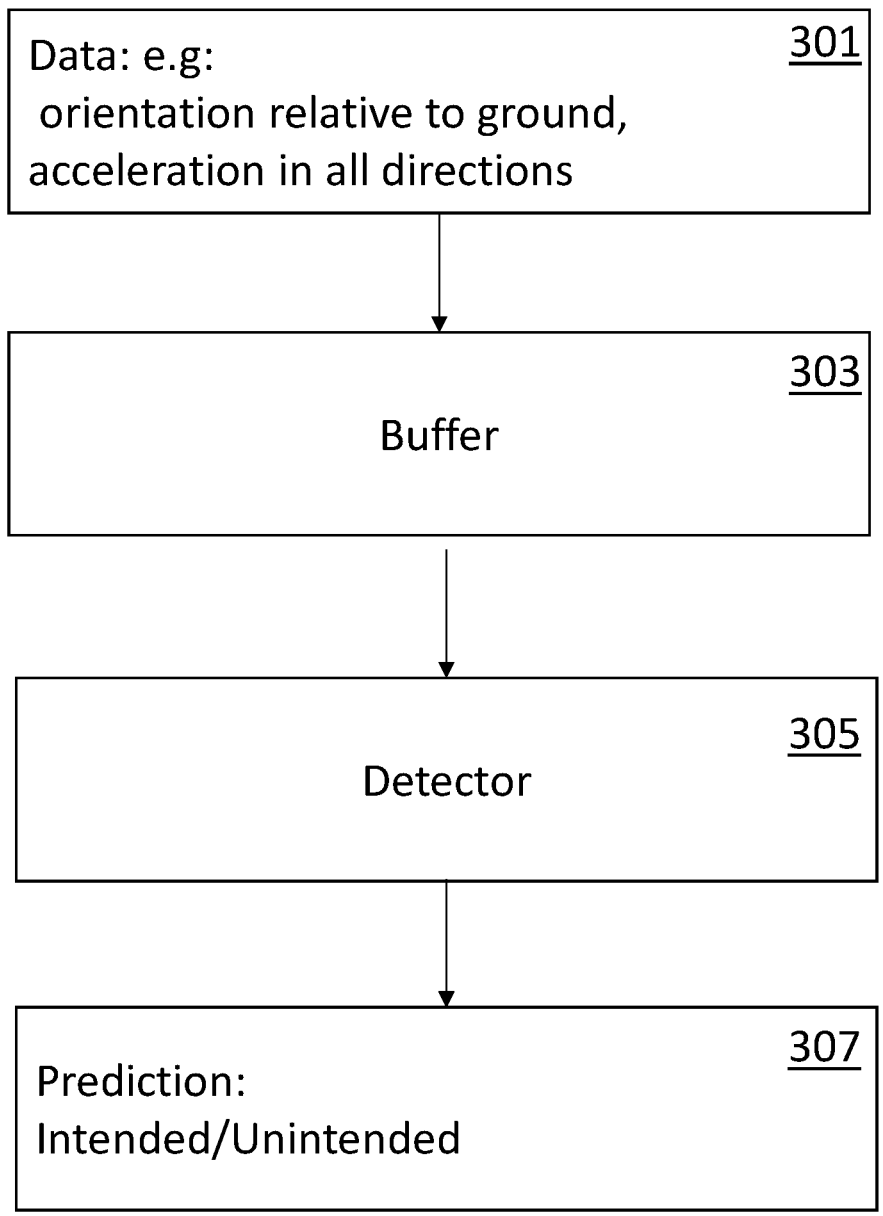
FIG. 3 schematically illustrates a method for determining if a change in device orientation is intended to change the viewing orientation, according to an embodiment of the invention.

In one embodiment, which is schematically illustrated in FIG. 3, data from one or more sensor (301) is input to storage such as a buffer (303). The data from the sensor(s) may include, for example, orientation relative to ground and acceleration in all directions, as well as other data such as, velocity, etc. The stored data can be transmitted, e.g., according to a pre-set schedule or when triggered (e.g., when a device changes orientation and/or when a request to change viewing orientation is received), to a detector (305). In some embodiments the data is processed, e.g., to extract features from it, prior to being transmitted to the detector. Extracted features can be input to a function run by the detector. The detector may be pre-programmed or pre-learned to enable determining if a change of device orientation (as apparent from the data from the sensor(s)) was intended to change the orientation of view or not. The detector may then issue a prediction if the data from the sensor indicates an intended change or not (307).

For example, a down direction sensor provides data at a rate of 10 times/second. Thus, in a time period of 2 seconds there are 20 values of one or more parameter supplied by this sensor. These 20 values may be extracted from input received from the down direction sensor and may be input to a trained ML model to obtain a prediction of intended or unintended change. The prediction from the ML model can then be used by a UI controller to affect (e.g., initiate or enable) or not a change of viewing orientation of a display of a mobile device.

Some sensors may sample kinematic parameters of a device inconsistently. For example, some sensors may output data only when triggered (e.g., when motion is detected) rather than continuously output data. Additionally, since different sensors may be used in different mobile devices, data may be output at different frequencies in different devices. Thus, sensors may not always reliably output a known and/or consistent number of values per time unit (e.g., per second). In some embodiments a processor (such as processor 102) may generate one or more data simulations to be used together with the features, e.g., to be input to a detector together with data samples from a sensor (to ensure that a consistent and known number of data samples are input to the detector) to obtain the determination of intended or unintended change.

Figure 4:
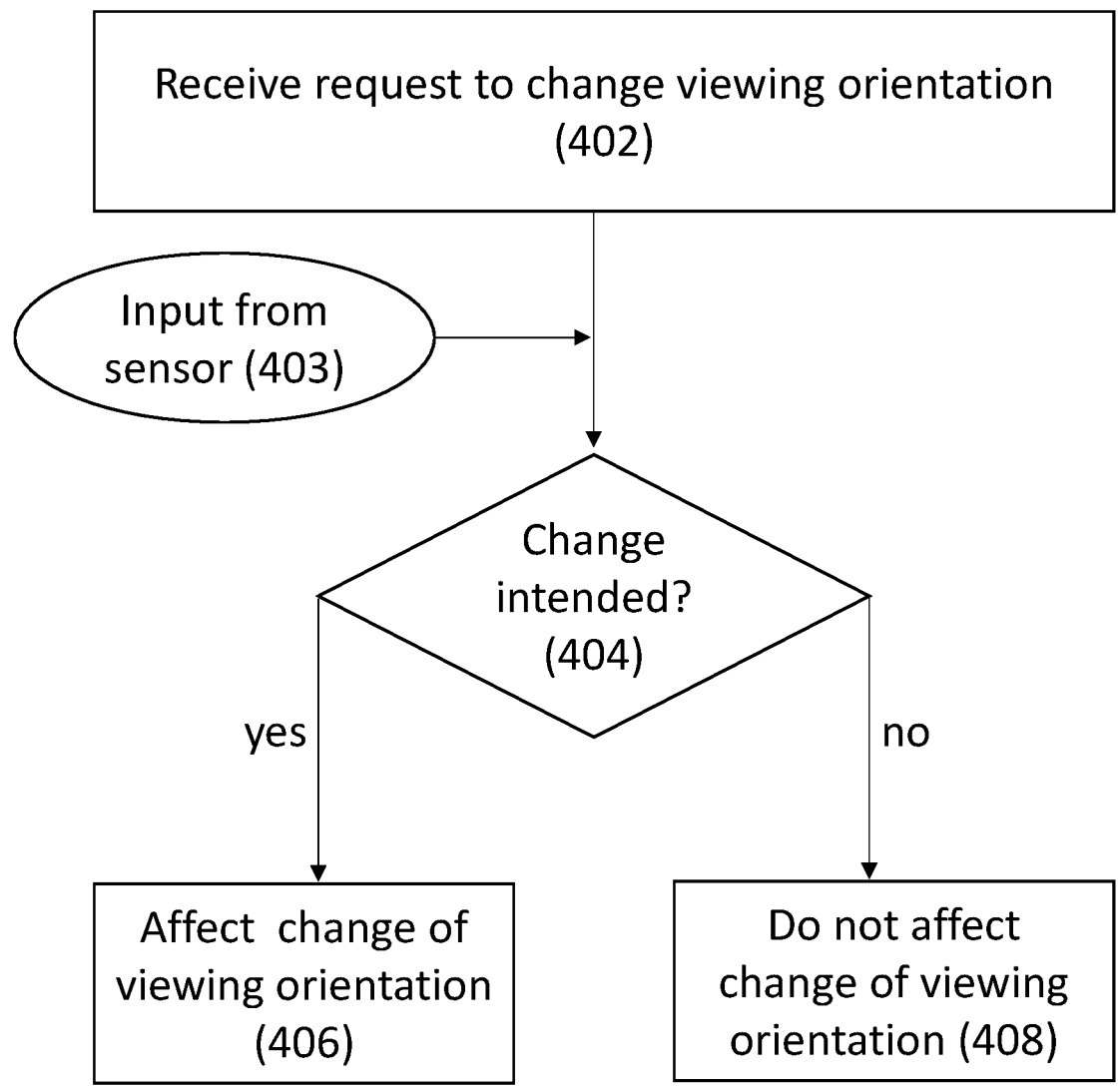
FIG. 4 schematically illustrates a method for enabling a rotation in viewing orientation, following a request, according to an embodiment of the invention.

In one embodiment, which is schematically illustrated in FIG. 4, a signal of a requested change of viewing orientation of a display is received at a processor (402). The signal may be generated based on a change in a dynamic (e.g., kinematic) parameter of the device and/or the signal may be generated by a suitable software application and/or hardware-based sensor typically provided with mobile devices, e.g., based on an orientation of the device. The signal may trigger the processor to obtain a determination of whether a change of dynamic parameters of the device indicates an intended change of viewing orientation and the processor may enable the requested change based on the determination. In other embodiments, the signal triggers the processor to obtain a determination of whether a change of kinematic parameters of the device indicates an intended change of viewing orientation and the processor may initiate a change in viewing orientation, based on the determination.

The processor may receive data input from one or more sensor (403), which can include a sensor of kinematic parameters and/or other sensors, e.g., as described above. Typically, the input of data (at step 403) may include data output from the sensor(s) immediately prior to the signal received at the processor (at step 402).

The processor then determines whether the data from the sensor demonstrates an intended change of viewing orientation by the user or not (404), based on the input data. If it is determined that the change was intended, the viewing orientation will be changed (406), whereas if it is determined that the change is not intended, then no change of viewing orientation will occur (408). In one embodiment, the viewing orientation may be changed according to a request. In another embodiment, the viewing orientation may be changed according to the data input form the one or more sensors.

Thus, embodiments of the invention provide a method for controlling a viewing orientation of displayed content on a mobile device, according to a user's intent, thereby improving accuracy of the device operation and usability of the mobile device.

What is claimed is:

1. A system for training a detector that is in communication with a device, the system comprising:
a memory unit to store for a limited time period data indicating a change in a parameter of the device;
a processor to
receive data obtained following the limited time period, and
tag the data stored in the memory unit as intended or unintended based on the data obtained following the limited time period; and
a detector to determine when a change in a parameter of the device implies an intended change, the detector to receive the tagged data as training examples and to provide a prediction if a change in the device parameter is intended or unintended, wherein the device is controlled based on the prediction.

2. The system of claim 1 wherein the device is a mobile device and wherein the parameter of the device is a dynamic parameter.

3. The system of claim 1 wherein the device comprises a user interface (UI) and wherein the processor controls the UI based on the prediction.

4. The system of claim 3 wherein the UI comprises a display and wherein the processor controls a viewing orientation of the display based on the prediction.

5. The system of claim 1 wherein data stored in the memory unit is overwritten by new data indicating a change in a parameter of the device.

6. The system of claim 1 wherein the limited time period comprises 1-5 seconds.

7. The system of claim 1 wherein the data stored in the memory unit and the data obtained following the limited time period are obtained by a sensor connected to the device, the sensor to sense a parameter of the device.

8. The system of claim 1 wherein the detector is trained on data obtained during normal use of the device.

9. The system of claim 1 wherein the detector comprises a machine learning model.

10. The system of claim 1 wherein the detector comprises a neural network.

11. A method for training a detector that is in communication with a device, the method comprising:
   storing in a memory unit, for a limited time period, data indicating a change in a parameter of the device;
   using a processor to tag the data stored in the memory unit as intended or unintended based on data obtained following the limited time period;
   training a detector using the tagged data, to provide a prediction when a change in a parameter of the device implies a user intended change; and
   using the prediction to control the device.

12. The method of claim 11 wherein the device is a mobile device and wherein the parameter of the device is a dynamic parameter.

13. The method of claim 11 wherein the device comprises UI and wherein the prediction is used to control the UI.

14. The method of claim 13 wherein the UI comprises a display and wherein the prediction is used to control a viewing orientation of the display.

15. The method of claim 11 comprising overwriting the data stored in the memory unit by new data indicating a change in a parameter of the device.

16. The method of claim 11 wherein the limited time period comprises 1-5 seconds.

17. The method of claim 11 comprising obtaining the data stored in the memory unit and the data obtained following the limited time period by a sensor connected to the device, the sensor to sense a parameter of the device.

18. The method of claim 11 wherein the detector is trained on data obtained during normal use of the device.

19. The method of claim 11 wherein the detector comprises a machine learning model.

20. The method of claim 11 wherein the detector comprises a neural network.

* * * * *